UNITED STATES PATENT OFFICE.

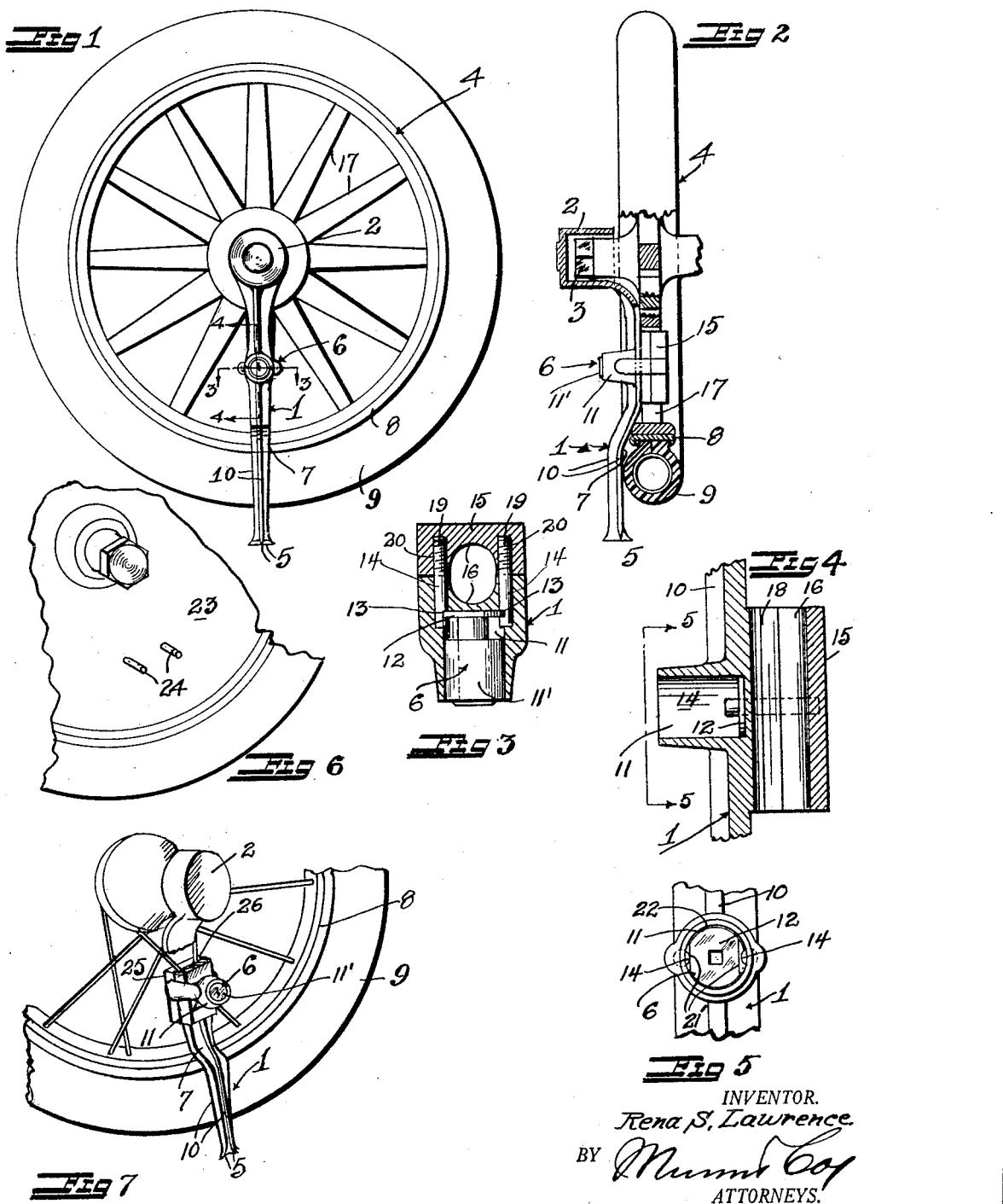

RENA S. LAWRENCE, OF SAN FRANCISCO, CALIFORNIA.

WHEEL-LOCK.

1,386,414.   Specification of Letters Patent.   Patented Aug. 2, 1921.

Application filed December 11, 1920. Serial No. 429,949.

*To all whom it may concern:*

Be it known that I, RENA S. LAWRENCE, a citizen of the United States, resident of San Francisco, county of San Francisco, and State of California, have invented a new and useful Wheel-Lock, of which the following is a specification.

The present invention relates to improvements in automobile locks of the type adapted for coöperation with a wheel of an automobile.

The primary object of the invention is to provide a lock which, when locked upon a wheel of an automobile, will prevent unauthorized removal of said wheel and also act as an obstruction so as to prevent full and normal rotation of the wheel; one end of the lock being extended outwardly beyond the rim whereby readily traceable marks or indentations will be made in the pavement or road accompanied by a noticeable "bumping noise," when a thief attempts to make off with the automobile.

Another object of the invention is to provide a lock of the character described which will be simple as to construction, strong, durable, inexpensive and reliable in use.

The invention has further objects and advantages, some of which, with the foregoing, will be set forth at length in the following description wherein I shall outline in full that form of the invention which I have selected for illustration in the drawing accompanying and forming a part of the present specification. In said drawing I have shown one form of the construction of my invention but it is to be understood that I do not limit myself to such form, since the invention as expressed in the claims may be embodied in a plurality of forms.

Referring to the drawing:

Figure 1 is a side elevation of an automobile wheel showing my improved lock associated therewith;

Fig. 2 is an end elevation of the wheel being broken away in part and in section to show the lock attached thereto;

Fig. 3 is an enlarged sectional view taken on line 3—3 of Fig. 1;

Fig. 4 is a sectional view taken on line 4—4 of Fig. 1;

Fig. 5 is a fragmentary front elevation of a detail of the invention taken within the bracket 5—5 of Fig. 4;

Fig. 6 is a fragmentary perspective view of a metal disk wheel showing the locking pins for the lock of my invention;

Fig. 7 is a fragmentary perspective view of a wire spoke wheel showing my lock applied thereto.

Referring to the present embodiment of the invention, there is provided an obstruction bar or member (1) preferably made of chilled steel. This bar is provided with an integral flanged cover member (2) at one end, for reception of the hub cap (3) of an automobile wheel (4) and at its other end is somewhat pointed and provided with cutting edges (5) adapted to mark the pavement or roadway. Locking means (6) is carried by the bar intermediate of its ends and is adapted for coöperation with the spokes of the wheel so as to lock the bar to the wheel, the bar being offset as at (7) so as to extend along the side of and outwardly beyond the rim (8) and the tire (9) of the wheel. The bar may be longitudinally ribbed as at (10) so as to provide strength therefor.

The locking means (6) comprises a lock socket (11) integral with an intermediate portion of the bar. A suitable key operated lock (11') is fixed in the socket (11) and includes a rotary disk type bolt (12). The bolt (12) is adapted to engage in notches (13) formed in locking pins (14) carried on a locking member (15). The member (15) is grooved as at (16) so as to receive a spoke (17) of the wheel and the bar is grooved as at (18) for the same purpose, said grooves being semi-circular in cross section whereby the grooved part of the bar (1) and the member (15) embrace and surround the spoke and abut one another on opposite sides of the spoke. The pins (14) are fixed to the member (15) on opposite sides of the groove (16) and preferably have threaded ends (19) turned into threaded sockets (20) in the member (15). The bar has openings (21) therein leading into the socket for the lock and the pins extend through the openings and into said lock socket. The disk-like lock bolt is straight on opposite sides as at (21') and otherwise is rounded as at (22). In one position the lock bolt is free of the notches in the pins and the bar is unlocked and in the other position the bolt engages in the notches and locks the bar (1) to the wheel.

It will thus be seen that with the bar (1) locked to the wheel as shown in Figs. 1 and 2 the cover (2) houses the hub cap and the bar extends outwardly along the spoke and past the rim and tire so that the outer end will act as an obstruction to the rotation of the wheel. This projecting part will make distinct traceable marks upon the road or pavement when the automobile is driven off and will permit of the following and apprehension of the thief.

In addition to the making of traceable marks, the obstruction bar produces a "thumping" noise which will attract attention and serve as an alarm or theft signal. The locking means (6) is such that it cannot be unlocked by being tampered with or by being dealt a heavy blow, it being necessary to lock and unlock the means (6) with the proper key.

An automobile equipped with my improved lock will be safeguarded against theft inasmuch as the lock not only prevents removal of the wheel by a thief and makes traceable marks but produces a noise which will serve as an alarm or theft signal.

I claim:

1. An automobile lock comprising a bar, key actuated locking means for securing the bar to a wheel of an automobile so that the bar projects outwardly beyond the perimeter of the wheel, and a cap on the inner end of the bar for reception of the hub cap of said wheel.

2. An automobile lock comprising a bar, key actuated locking means for securing said bar to a wheel of an automobile so that one end of the bar extends outwardly beyond the perimeter of the wheel and the other end is disposed adjacent the hub of said wheel and a hub cap cover on said inner end.

3. An automobile lock comprising a bar, key actuated locking means for securing said bar to a wheel of an automobile so that one end of the bar extends outwardly beyond the perimeter of the wheel and the other end is disposed adjacent the hub of said wheel and a hub cap cover on said inner end, said bar having a cutting die on its extended end.

4. In combination with a wheel of an automobile, of means for engaging and preventing removal of the hub cap of said wheel, said means having an extension projecting outwardly beyond the perimeter of the wheel so as to act as an obstruction to free rotation of said wheel and means for locking said means upon the wheel.

RENA S. LAWRENCE.